(12) United States Patent
Pawlowski et al.

(10) Patent No.: US 7,361,092 B2
(45) Date of Patent: Apr. 22, 2008

(54) BALANCE ASSEMBLY FOR COUPLING FIRST AND SECOND ROTATING MEMBERS

(75) Inventors: Roger P Pawlowski, Macomb, MI (US); Jeff Orzechowski, Troy, MI (US)

(73) Assignee: Chrysler LLC, Auburn Hills, MI (US)

( * ) Notice: Subject to any disclaimer, the term of this patent is extended or adjusted under 35 U.S.C. 154(b) by 185 days.

(21) Appl. No.: 11/343,062

(22) Filed: Jan. 30, 2006

(65) Prior Publication Data

US 2007/0178976 A1   Aug. 2, 2007

(51) Int. Cl.
*F16D 3/40* (2006.01)
(52) U.S. Cl. .................. 464/23; 464/127; 403/337
(58) Field of Classification Search .............. 464/23, 464/127, 180, 182; 403/337, 338; 74/572.21; 285/412
See application file for complete search history.

(56) References Cited

U.S. PATENT DOCUMENTS

| | | | |
|---|---|---|---|
| 2,602,308 A * | 7/1952 | Bonnett | ................ 464/182 X |
| 4,478,593 A * | 10/1984 | Brown | ....................... 464/182 |
| 5,096,345 A | 3/1992 | Toyomoto | |
| 5,133,226 A | 7/1992 | Muller | |
| 5,450,337 A * | 9/1995 | Chuan-Yuan et al. | ... 464/180 X |
| 6,123,623 A | 9/2000 | Sugiyama | |
| 6,855,087 B2 | 2/2005 | Chakraborty | |
| 6,893,349 B2 | 5/2005 | Krugman et al. | |
| 7,134,361 B2 * | 11/2006 | Ninomiya et al. | ....... 74/572.21 |

FOREIGN PATENT DOCUMENTS

| | | | | |
|---|---|---|---|---|
| FR | 2 427 507 | * | 2/1980 | |
| JP | 6-227274 | * | 8/1994 | ................. 464/180 |

* cited by examiner

*Primary Examiner*—Greg Binda
(74) *Attorney, Agent, or Firm*—Ralph E. Smith

(57) ABSTRACT

A flange member is disclosed for a balance assembly that includes a first rotating element coupled to a second rotating element. The flange member includes a main body exhibiting a predetermined imbalance vector when rotated about an axis of rotation. The flange member also includes a plurality of fastener apertures for attaching one of the first and second rotation elements to the main body. Angular spacing between each of the fastener apertures is substantially equal but for one fastener aperture, such that angular spacing is greater to one side of the one fastener aperture, and such that angular spacing is less to another side of the one fastener aperture.

11 Claims, 2 Drawing Sheets

BALANCE ASSEMBLY FOR COUPLING FIRST AND SECOND ROTATING MEMBERS

FIELD

The present disclosure relates to a balance assembly for a motor vehicle and, more particularly, relates to a balance assembly for coupling first and second rotating members.

BACKGROUND

Many mechanisms include rotating members for transferring power. For instance, a vehicle drive train includes a drive shaft assembly that transfers power to an axle assembly. Typically, weight is distributed unevenly about the axis of rotation of these rotating members, creating an imbalance during rotation. The imbalance can be measured and expressed as an imbalance vector. The imbalance vector can be significant enough to cause undesirable vibration.

Thus, various techniques have been developed for balancing rotating members to reduce such vibration. One such technique involves adding material to one or more of the components. Material can be welded, threaded, or attached to the assembly in other ways. The material is added in a location that is offset about an axis from the imbalance vector of the rotating members. As such, the rotating mass of the added weight substantially cancels out the imbalance vector of the assembly. Thus, the assembly can rotate in a more balanced manner with reduced vibration. One problem with adding material in this method, however, is that determining the proper location for the added material and then adding the material can be time consuming and complicated. Also, the material can detach from the assembly at some point during the operating life of the assembly.

Other techniques involve determining the imbalance vector of both rotating members separately and then attaching the rotating members such that their imbalance vectors point in opposite directions relative to the axis of rotation for more balanced rotation. However, the rotating members can be assembled incorrectly, such that the imbalance vectors of the rotating members add together and increase operational vibration of the assembly. Accordingly, a need remains for a simpler and more effective means of balancing a rotational assembly.

SUMMARY

A flange member for a balance assembly according to a first aspect of the present invention including a first rotating element coupled to a second rotating element. The flange member includes a main body exhibiting a predetermined imbalance vector when rotated about an axis of rotation. The flange member also includes a plurality of fastener apertures for attaching one of the first and second rotation elements to the main body. Angular spacing between each of the fastener apertures is substantially equal but for one fastener aperture, such that angular spacing is greater to one side of the one fastener aperture, and such that angular spacing is less to another side of the one fastener aperture.

According to a second aspect of the present invention, a balance assembly is provided including a first rotating element, a second rotating element, and a flange member coupled to the first rotating element. The flange member exhibits a predetermined imbalance vector when rotated about an axis of rotation. The flange member includes a plurality of fastener apertures for coupling to the second rotating element. Angular spacing between each of the fastener apertures relative to the axis of rotation is substantially equal but for one fastener aperture, such that angular spacing is greater to one side of the one fastener aperture and angular spacing is less to another side of the fastener aperture.

According to a third aspect of the present invention, a vehicle is disclosed including an axle assembly, a drive shaft assembly, a plurality of fasteners, and a flange member. The flange member includes a first aperture that is coaxial with an axis of rotation. The axle assembly is coupled to the flange member via the first aperture, and the flange member includes a plurality of integrally attached projections that cause mass to be distributed unevenly about the axis of rotation to thereby cause the flange member to exhibit a predetermined imbalance vector when rotated about the axis of rotation. The flange member further includes a plurality of fastener apertures, and each one of the fasteners extends through a corresponding one of the plurality of fastener apertures to thereby couple the drive shaft assembly to the flange member such that the drive shaft assembly abuts against the drive face. Angular spacing between each of the fastener apertures is substantially equal but for one of the fastener apertures. As such, angular spacing is greater to one side of the one fastener aperture, and angular spacing is less to another side of the one fastener aperture.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
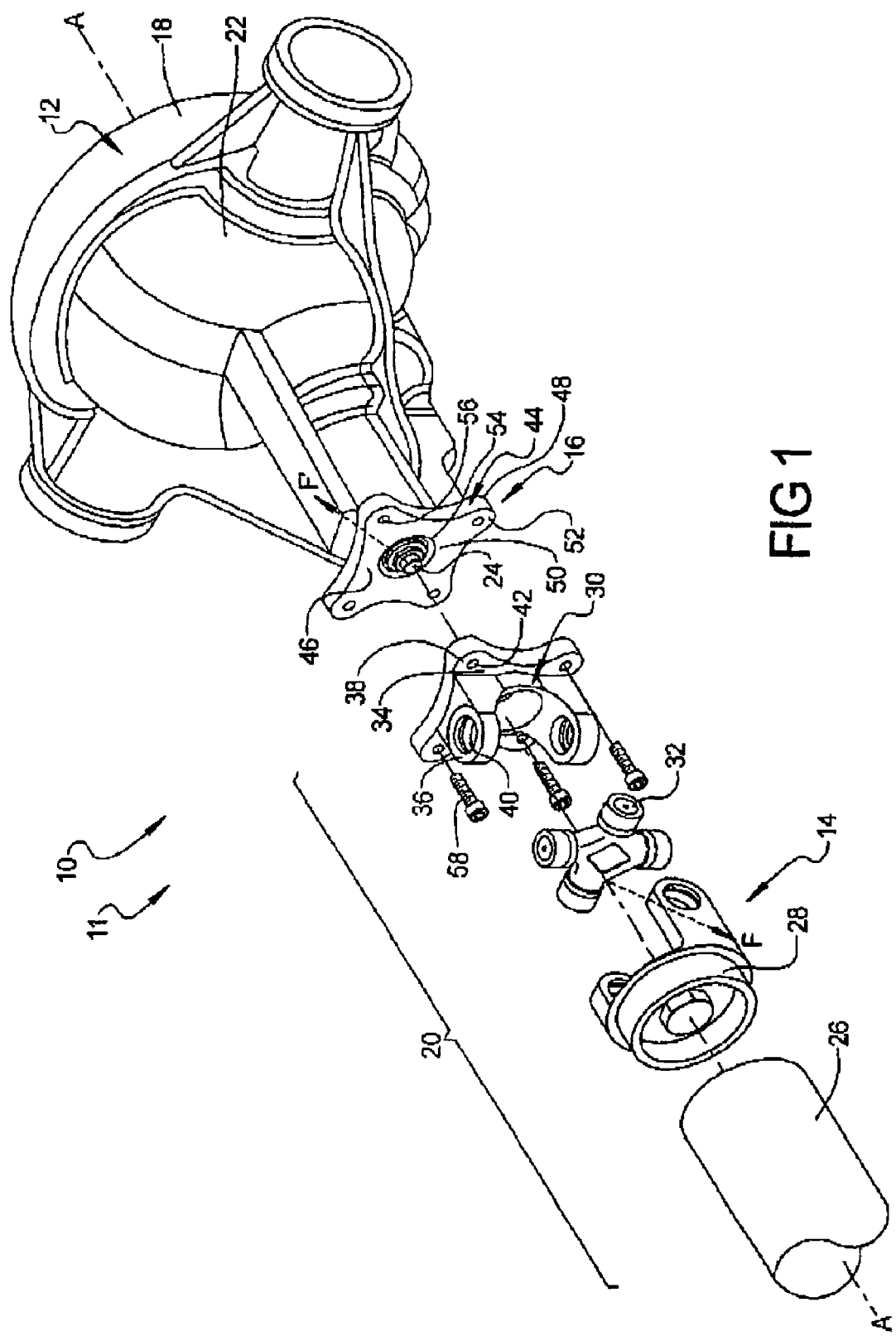
FIG. 1 is an exploded perspective view of a drive train of a vehicle that includes a flange member according to an exemplary embodiment of the present invention.

Referring initially to FIG. 1, a portion of a vehicle 10 is shown. More specifically, a balance assembly 11 of the vehicle 10 is shown that includes a first rotating element 12, a second rotating element 14, and a flange member 16. As will be explained in greater detail, the flange member 16 provides more balanced rotation of the balance assembly 11.

In the embodiment shown, the first rotating element 12 is an axle assembly 18, and the second rotating element 14 is a drive assembly 20. It will be appreciated that the first rotating element 12 and the second rotating element 14 could be of any type other than the axle assembly 18 and the drive assembly 20, respectively, without departing from the scope of the present disclosure. It will also be appreciated that the balance assembly 11 could be of any suitable type independent of a vehicle 10 without departing from the scope of the present disclosure.

As will be described below, components of the axle assembly 18, components from the drive assembly 20, and the flange member 16 rotate as a unit about an axis of rotation, A. More specifically, the flange member 16 interconnects the first rotating element 12 and the second rotating element 14 to allow power to be transferred between the axle assembly 18 and the drive assembly 20.

The axle assembly 18 includes a housing 22 and a rotating shaft 24 that rotates about the axis, A, relative to the housing 22. The drive assembly 20 includes a drive shaft 26 and a first yoke 28 that is coupled to and rotates with the drive shaft 26. The drive assembly 20 also includes a second yoke 30, which will be described in greater detail below. Furthermore, the drive assembly 20 includes universal joint member 32 that interconnects the first yoke 28 and the second yoke 30 such that the second yoke 30 is able to rotate with and pivot relative to the first yoke 28. It should be appreciated that the components of the axle assembly 18 and the drive assembly 20 can be of various sizes and can have various features according to the particular requirements of the balance assembly 11 without departing from the scope of the present disclosure.

In the embodiment shown, the second yoke 30 includes a first body 34 and a second body 36 that is integrally attached to the first body 34. The first body 34 is generally flat and includes a plurality of projections 38 that extend transverse to the axis, A. The second body 36 is U-shaped and is oriented perpendicular to the first body 34. The second body 36 also includes a plurality of first apertures 40 that extend transverse to the axis, A. The universal joint member 32 is coupled to the second yoke 30 via fasteners that extend through the first apertures 40.

The second yoke 30 also includes a plurality of second apertures 42. Each of the second apertures 42 extend through one of the projections 38 approximately parallel to the axis, A. In one embodiment, each of the second apertures 42 is radially spaced from the axis, A, by approximately the same amount.

Figure 2:
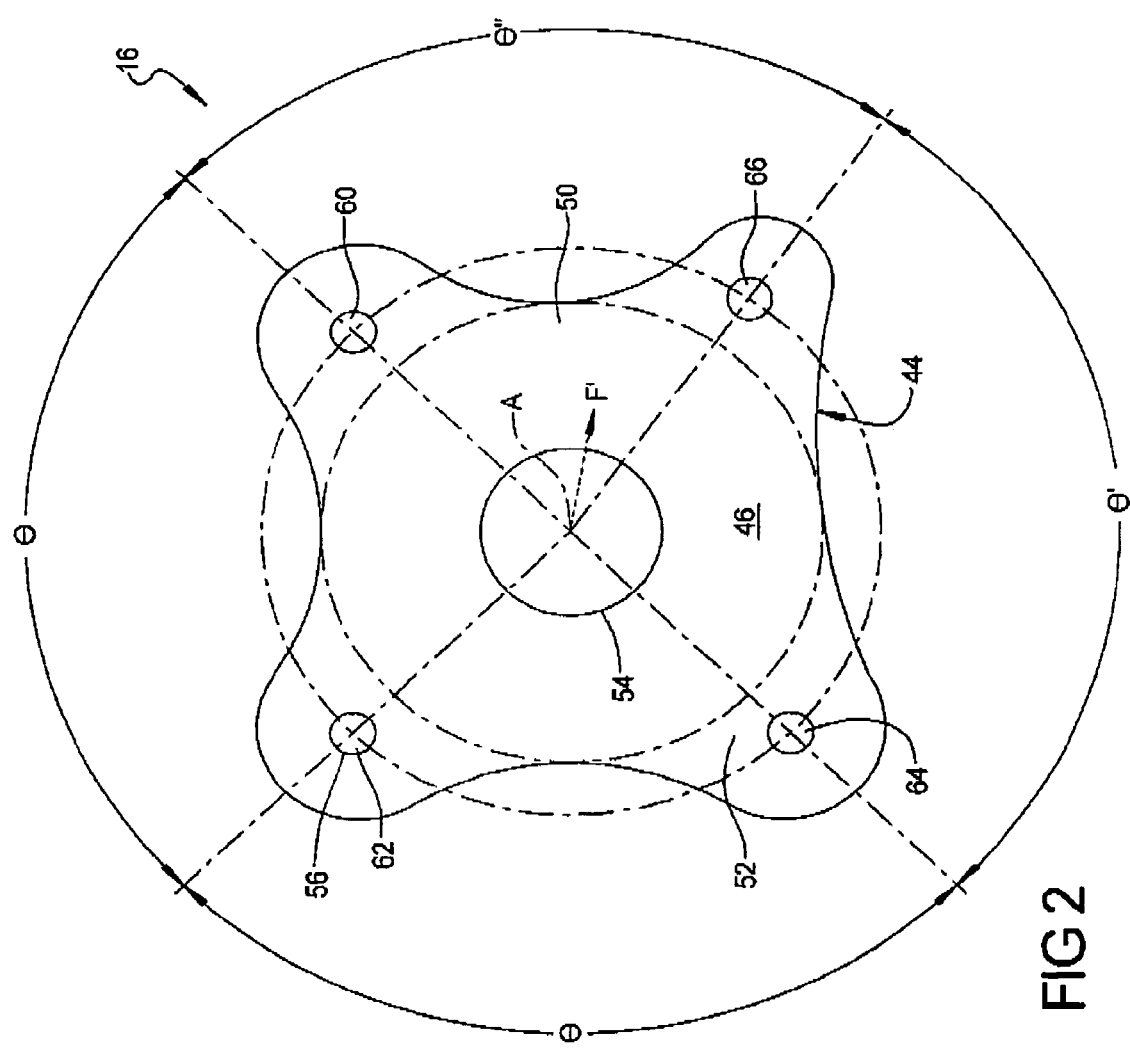
FIG. 2 is a plan view of one embodiment of the flange member of FIG. 1 according to an exemplary embodiment of the present invention.

As shown in FIGS. 1 and 2, the flange member 16 includes a main body 44 that is generally flat so as to define a drive face 46 and an axle face 48. The main body 44 includes a base portion 50 and a plurality of projections 52. (The delineation between the base portion 50 and the projections 52 is represented in FIG. 2 by a dashed line.) The projections 52 are integrally attached to the base portion 50 and extend away from the base portion 50 transverse to the axis, A. The flange member 16 also includes a first aperture 54 that is coaxial with the axis of rotation, A.

The flange member 16 also includes a plurality of fastener apertures 56. Each fastener aperture 56 is included on one of the projections 52 and extends approximately parallel to the axis of rotation, A. As shown in FIG. 2, each of the fastener apertures 56 are disposed at approximately the same radial distance away from the axis of rotation, A. However, those having ordinary skill in the art will appreciate that the radial distance of the fastener apertures 56 could vary without departing from the scope of the invention. It will also be appreciated that the flange member 16 could include any number of fastener apertures 56 without departing from the scope of the present invention.

The axle assembly 18 is coupled to the flange member 16 via the first aperture 54. For instance, in one embodiment, the flange member 16 is pressed onto the rotating shaft 24 of the axle assembly 18 such that the rotating shaft 24 is disposed in the first aperture 54. A fastener, such as a nut, is used to further retain the flange member 16 on the rotating shaft 24. Accordingly, the flange member 16 is able to rotate with the rotating shaft 24 of the axle assembly 18.

The balance assembly 10 further includes a plurality of fasteners 58. In the embodiment shown, the fasteners 58 are bolts and nuts. However, those having ordinary skill in the art will appreciate that the fasteners 58 could be of any suitable type without departing from the scope of the invention. Each one of the fasteners 58 extends through a second aperture 42 of the second yoke 30 and also through a fastener aperture 56 of the flange member 16 to thereby couple the drive shaft assembly 20 to the flange member 16. When coupled, the second yoke drive shaft assembly 20 substantially abuts against the drive face 46 of the flange member 16. Accordingly, the flange member 16 is able to rotate with the rotating shaft 24 of the axle assembly 18 and with the second yoke 30 of the drive shaft assembly 20.

As shown in FIGS. 1 and 2, the flange member 16 exhibits a predetermined imbalance vector F' when rotated about the axis of rotation. The mass of the main body 44 of the flange member 16 is distributed unevenly about the axis of rotation, A, to cause the predetermined imbalance vector F'. More specifically, the mass of the base portion 50 is unevenly distributed about the axis of rotation, A. Similarly, the projections 52 are of different sizes and the projections 52 are disposed unevenly about the periphery of the base portion 50 such that the mass of the flange member 16 is distributed unevenly about the axis of rotation, A. The mass can be distributed in any suitable manner such that the flange member 16 exhibits the desired imbalance vector F'.

Thus, for more balanced rotation of the balance assembly 11, the imbalance vector of the drive assembly 20 and the axle assembly 18 are determined. Then, a combined imbalance vector F is calculated by adding both of these imbalance vectors as shown in FIG. 1. Next, the flange member 16, having a predetermined imbalance vector F', is installed such that the imbalance vector F' of the flange member 16 is directed approximately 180° away from the combined imbalance vector F of the drive assembly 20 and the axle assembly 18 (with respect to the axis, A) as shown in FIG. 1. Because the imbalance vectors F, F' are offset, the balance assembly 11 rotates with Less vibration.

It will be appreciated that the sole means for achieving the imbalance vector F' of the flange member 16 is by distributing integrally attached mass, i.e., the mass of the base portion 50 and the projections 52, unevenly about the axis, A. Thus, the flange member 16 is different from many prior art balancing means, including welding material, threading material, or otherwise adding mass to the rotating components. Unlike those prior art balancing means, the balance assembly 11 can be assembled more easily. Once the flange member 16 is installed, no additional material need be attached for achieving balanced rotation. Accordingly, it is significantly less confusing, less time consuming, and more convenient to utilize the flange member 16 for balancing the balance assembly 11.

In addition, angular spacing between each of the fastener apertures 56 is substantially equal but for one fastener aperture 56. More specifically, in the embodiment shown, the fastener apertures 56 include a first fastener aperture 60, a second fastener aperture 62, a third fastener aperture 64, and an alignment aperture 66. The second fastener aperture 62 is angularly spaced from the first fastener aperture 60 (its neighboring fastener aperture) by θ. The third fastener aperture 64 is angularly spaced from the second fastener aperture 62 (its neighboring fastener aperture) by θ as well. As such, the angular space θ between the first and second apertures 60, 62 and between the second and third apertures 62, 64 is substantially the same. However, the alignment aperture 66 is angularly spaced from the third fastener aperture 64 by a substantially different amount, θ', as compared to the angular spacing, θ, between the first and second fastener apertures 60, 62 and between the second and third fastener apertures 62, 64. Of course, the angular spacing, θ", between the alignment aperture 66 and the first fastener aperture 60 is different than θ as well. In one embodiment, for instance, θ is approximately 90°, θ' is approximately 100°, and θ" is approximately 80°.

Because the angular spacing is constant for all but one of the fastener apertures 56, the flange member 16 can be manufactured more easily. For instance, when manufacturing the flange member 16 of FIG. 2, the first fastener aperture 60 can be formed. Then, the flange member 16 is rotated relative to the drill bit by θ before forming the second fastener aperture 62. The flange member 16 is then rotated by the same amount θ before forming the third fastener aperture 64. It is only with the alignment aperture 66 that the amount of rotation changes.

The flange member 16 is relatively simple to manufacture because all mass is integrally attached, and because only one fastener aperture 56 has irregular angular spacing. In addition, the flange member 16 can only be installed in one orientation in the balance assembly 11 because of the alignment aperture 66 is offset. More specifically, if it is attempted to install the flange member 16 with the drive face 46 facing the axle assembly and the axle face 48 facing the drive assembly 20, at least one of the second apertures 42 of the second yoke 30 will be misaligned with at least one fastener aperture 56 of the flange member 16. Accordingly, the fastener apertures 56 are disposed on the flange member 16 to ensure proper installation and to ensure proper balancing of the balance assembly 11.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flange member for a balance assembly that comprises a first rotating element coupled to a second rotating element, the flange member comprising:
    a main body including a base portion and a plurality of projections that are integrally attached to the base portion and that extend away from the base portion, the main body having a mass that is distributed unevenly about an axis of rotation of the main body such that the main body exhibits a predetermined imbalance vector when rotated about the axis of rotation; and
    a plurality of fastener apertures for attaching one of the first and second rotation elements to the main body, wherein angular spacing between each of the fastener apertures is substantially equal but for one fastener aperture, such that angular spacing is greater to one side of the one fastener aperture, and such that angular spacing is less to another side of the one fastener aperture.

2. The flange member of claim 1, wherein each of the plurality of fastener apertures are disposed at approximately the same radial distance away from the axis of rotation.

3. The flange member of claim 1, further comprising a first aperture, and wherein the axis of rotation is coaxial with the first aperture.

4. The flange member of claim 1, wherein the plurality of the fastener apertures include a first fastener aperture, a second fastener aperture, a third fastener aperture, and an alignment aperture, wherein the second fastener aperture is angularly spaced from the first fastener aperture by substantially the same amount as the third fastener aperture is spaced from the second fastener aperture, and wherein the alignment aperture is angularly spaced from the third fastener aperture by a substantially different amount compared to the angular spacing between the first and second fastener apertures and between the second and third fastener apertures.

5. A balance assembly comprising:
    a first rotating element;
    a second rotating element; and
    a flange member coupled to the first rotating element, the flange member including a main body with a base portion and a plurality of projections that are integrally attached to the base portion and that extend away from the base portion, the main body having a mass that is distributed unevenly about an axis of rotation of the flange member such that the flange member exhibits a predetermined imbalance vector when rotated about the axis of rotation, wherein the flange member comprises a plurality of fastener apertures for coupling to the second rotating element, wherein angular spacing between each of the fastener apertures relative to the axis of rotation is substantially equal but for one fastener aperture, such that angular spacing is greater to one side of the one fastener aperture, and such that angular spacing is less to another side of the one fastener aperture.

6. The balance assembly of claim 5, wherein each of the plurality of fastener apertures are disposed at approximately the same radial distance away from the axis of rotation.

7. The balance assembly of claim 5, further comprising a first aperture, and wherein the axis of rotation is coaxial with the first aperture, and wherein the first rotating element is coupled to the flange member via the first aperture.

8. The balance assembly of claim 5, wherein the plurality of the fastener apertures include a first fastener aperture, a second fastener aperture, a third fastener aperture, and an alignment aperture, wherein the second fastener aperture is angularly spaced from the first fastener aperture by substantially the same amount as the third fastener aperture is spaced from the second fastener aperture, and wherein the alignment aperture is angularly spaced from the third fastener aperture by a substantially different amount compared to the angular spacing between the first and second fastener apertures and between the second and third fastener apertures.

9. A vehicle comprising:
    an axle assembly;
    a drive shaft assembly;
    a plurality of fasteners; and
    a flange member with a drive face and a first aperture that is coaxial with an axis of rotation, wherein the axle assembly is coupled to the flange member via the first aperture, wherein the flange member comprises a plurality of integrally attached projections that cause mass to be distributed unevenly about the axis of rotation to thereby cause the flange member to exhibit a predetermined imbalance vector when rotated about the axis of rotation, and wherein the flange member further comprises a plurality of fastener apertures, wherein each one of the plurality of fasteners extends through a corresponding one of the plurality of fastener apertures to thereby couple the drive shaft assembly to the flange member such that the drive shaft assembly abuts against the drive face, and wherein angular spacing between each of the fastener apertures is substantially equal but for one fastener aperture, such that angular spacing is greater to one side of the one fastener aperture, and such that angular spacing is less to another side of the one fastener aperture.

10. The vehicle of claim 9, wherein each of the plurality of fastener apertures are disposed at approximately the same radial distance away from the axis of rotation.

11. The vehicle of claim 9, wherein the plurality of the fastener apertures include a first fastener aperture, a second fastener aperture, a third fastener aperture, and an alignment aperture, wherein the second fastener aperture is angularly spaced from the first fastener aperture by substantially the same amount as the third fastener aperture is spaced from the second fastener aperture, and wherein the alignment aperture is angularly spaced from the third fastener aperture by a substantially different amount compared to the angular spacing between the first and second fastener apertures and between the second and third fastener apertures.

* * * * *